United States Patent
Liang (10) Patent No.: US 7,062,553 B2
(45) Date of Patent: Jun. 13, 2006

(54) VIRUS EPIDEMIC DAMAGE CONTROL SYSTEM AND METHOD FOR NETWORK ENVIRONMENT

(75) Inventor: Yung Chang Liang, Cupertino, CA (US)

(73) Assignee: Trend Micro, Inc. (JP)

( * ) Notice: Subject to any disclaimer, the term of this patent is extended or adjusted under 35 U.S.C. 154(b) by 672 days.

(21) Appl. No.: 10/199,078

(22) Filed: Jul. 22, 2002

(65) Prior Publication Data

US 2003/0115483 A1   Jun. 19, 2003

Related U.S. Application Data

(60) Provisional application No. 60/337,533, filed on Dec. 4, 2001.

(51) Int. Cl.
  *G06F 15/173* (2006.01)
  *G06F 11/30* (2006.01)
  *G06F 12/14* (2006.01)

(52) U.S. Cl. ............... 709/224; 713/187; 713/188; 713/201

(58) Field of Classification Search ............ 709/224, 709/223, 246; 713/201, 200; 714/28, 38
See application file for complete search history.

(56) References Cited

U.S. PATENT DOCUMENTS 6,108,799 A * 8/2000 Boulay et al. ............... 714/38
2002/0065938 A1 * 5/2002 Jungck et al. ............... 709/246
2002/0066035 A1 * 5/2002 Dapp .......................... 713/201
2003/0061506 A1 * 3/2003 Cooper et al. ............... 713/201
2003/0105976 A1 * 6/2003 Copeland, III .............. 713/201
2003/0191957 A1 * 10/2003 Hypponen et al. .......... 713/200
2005/0021740 A1 * 1/2005 Bar et al. .................... 709/224

* cited by examiner

*Primary Examiner*—Wen-Tai Lin
(74) *Attorney, Agent, or Firm*—Beyer Weaver & Thomas LLP (57) ABSTRACT

A system and method for providing damage control caused by a virus epidemic in a network environment are advantageously provided according to the intention. The system according to a preferred embedment of the invention effectively and rapidly distributes antivirus protection and cure measures within the network so as to reduce the level of damage during the virus epidemic. The method according to the invention contains the spread of a computer virus in a network system by detecting the traffic flow and analyzing the identical sections in files modified in a short time period. The network system accordingly includes a management server, a management information database (MIB) having a plurality of tasks for performing work in the network system, and a plurality of device node. Each network task corresponds to an event occurring in the system. Damage control caused by a virus epidemic in a network environment is controlled and level of damage is accordingly reduced.

10 Claims, 5 Drawing Sheets

VIRUS EPIDEMIC DAMAGE CONTROL SYSTEM AND METHOD FOR NETWORK ENVIRONMENT

RELATED APPLICATIONS

The present application generally relates to, and claims priority of, U.S. Provisional Patent Application Ser. No. 60/337,533 filed on Dec. 4, 2001, having common inventiorship herewith, which is incorporated by reference herein.

BACKGROUND OF THE INVENTION

1. Field of the Invention

The present invention generally relates to antivirus control in a network system and, more particularly, damage control against virus outbreak in a network environment with a plurality of device nodes under malicious code attack.

2. Description of the Related Art

When a network environment experiences an undesirable code attack, network manager(s) and information technology (IT) specialists need to investigate the situation as soon as the attack is discovered. IT specialists then determine the proper tool or tools that would most effectively block and, hopefully, remove the undesirable intruding code altogether and restore the network system to normal as soon as possible. The process of pinpointing the intruding code and finding the proper solution is often tedious, complex and time consuming.

The Internet is an ideal mass medium for the spread of computer viruses since virtually every computer needs to be connected to another computer or network either directly or indirectly. The Internet, with all its benefits and fascinations, is nonetheless an effective and efficient medium for an intentional spread of malicious code attack. It has been estimated that some fast-paced viruses can spread throughout the entire Internet within a matter of a couple of hours if not effectively stopped. In fact, For any network environment, be it the Internet, a wide area network (WAN), a corporate local area network (LAN) or even wireless communications networks for mobile phones and personal digital assistant (PDA) devices, the more data transmitted and the more services offered, the more likely viruses are able to infect those networks.

In day-to-day efforts against computer viruses and other terminal device viruses, an end user is constantly looking for solutions against such viruses. Even in the case of corporate networks that are closely guarded by an anti virus firewall and all sorts of virus protection software, some viruses are still able to penetrate then and do great herein. This is because conventional anti virus technology generally relies on already identified viruses. In other words, conventional anti virus schemes are usually effective against known computer viruses, but are unable to block unknown viruses. A newly-captured virus has to be analyzed by, e.g., an anti virus service provider. Therefore, terminal devices such as computers connected to a LAN or WAN is generally unable to have anti virus protection against unknown viruses with conventional anti virus software.

When the terminal device or computer connected to a network is subject to attack by an unknown virus penetrating into the network, it is the responsibility of network managers to guard against such attacks and the restore the network to normal operating status as quickly as possible. The level of preparedness in a network is dependent upon knowing the probability of a virus successfully penetrate the corporate network, e.g., LAN. When a computer virus does penetrate into a corporate LAN, the spreading of the virus infection in the network will be only as fast and as end effective as users on the LAN are able to utilize the network. Some of the latest viruses are so fast and ferocious that rapid and effective counter-measures must be immediately implemented by LAN managers in order to reduce the damage likely to result.

One conventional measure a LAN manager can undertake is to physically unplug network cables when there is an outbreak of a ferocious virus that has already penetrated the LAN. However, such drastic measures are likely to undesirably affect the uninfected sectors of the corporate LAN as well as cause inconvenience for end users. On the other hand, any hesitation, including the time spent on retrieving anti virus tools, can lead to greater damage to the corporate LAN. In the time frame for an anti virus service provider to analyze and implement a cure, the entire corporate LAN might be thoroughly infected.

There is thus a general need in the art for effective and optimal antivirus control against computer viruses in a network system overcoming at least the aforementioned shortcomings in the art. In particular, there is a need in the art for an optimal method and system for effective damage control against the spread of computer viruses in a network.

SUMMARY OF THE INVENTION

The present invention accordingly provides a system and method for effectively managing damage caused by a computer virus epidemic in a network environment by effectively and rapidly distributing antivirus protection and cure measures within the network so as to optimally reduce the level of damage during the virus epidemic.

The invention further provides a system and method for providing damage control caused by a virus epidemic in a network environment that rapidly and generally simultaneously implements measures of antivirus protection and cures on multiple computers within the network so as to reduce the level of damage in an virus epidemic.

The present invention further provides a system and method for providing damage control caused by a virus epidemic in a network environment that includes active virus detection and blocking measures before, during and after an epidemic outbreak therein.

A preferred embodiment according to the invention advantageously provides process for virus epidemic damage control in a network system. Initially, traffic flow in all device nodes in the network system is tested to find abnormal traffic flow. A neighborhood of a device node having unpredicted traffic flow is then determined. The device node having unpredicted traffic flow is defined as an abnormal device node, conversely, a device node having predicted traffic flow is accordingly defined as a normal device node. The management server in the network system finds at least one listening device for detecting traffic flow of the abnormal device node. Traffic flow of the abnormal device node is determined for a predetermined time interval by at least one listening device. A segment including the abnormal device node is then partially isolated other than instructions and results assigned by said management server. The size of the segment including the abnormal device node is reduced by rejecting the normal device node. Next, the management server transfers an antivirus task into the abnormal segment for finding a computer virus. The management server then instructs the task leader to eradicate the virus.

A further embodiment according to the invention for finding a virus is by searching the modification sections in files of the network system. Initially, the system finds a modified file in a predetermined time interval. The system then determines a first plurality of modified sections of the modified file. The system finds a second modified file in the predetermined time interval. Next, the system determines a second plurality of modified sections in the second file. The system compares the first modified file against the second modified file. The process is repeated for other files being modified in the predetermined time period. The management server receives info on the conditions of the virus infection. If no virus is found, i.e., all the modified sections from different modified files are not identical nor similar, then the process comes to the end. Otherwise, the management server is informed that there is possibly attack a virus is when modified sections from different modified files are identical or similar. The system accordingly quarantine an area containing device nodes having files with the modified sections. Finally, the system transfers an antivirus task into said the quarantine area for finding and eradicating the virus.

Another embodiment of the invention advantageously provides a computer virus damage control network system comprising a management server connected to a plurality of devices nodes, a management information database (MIB) being connected to the management server system, a task database in the MIB that records a plurality of tasks capable of being performed in the network system, and a cure database stored in the MIB that records a plurality of cures for performing the tasks of the task database.

BRIEF DESCRIPTION OF THE DRAWINGS

The above and other features and advantages according to the invention are described herein in the following Detailed Description in conjunction with the accompanying drawings (not necessarily drawn to scale) in which:

FIG. 4 is a flow diagram illustrating an exemplary process of the virus epidemic damage control method for finding a computer virus according to another preferred embodiment of the invention; and.

DETAILED DESCRIPTION OF PREFERRED EMBODIMENTS

Figure 1:
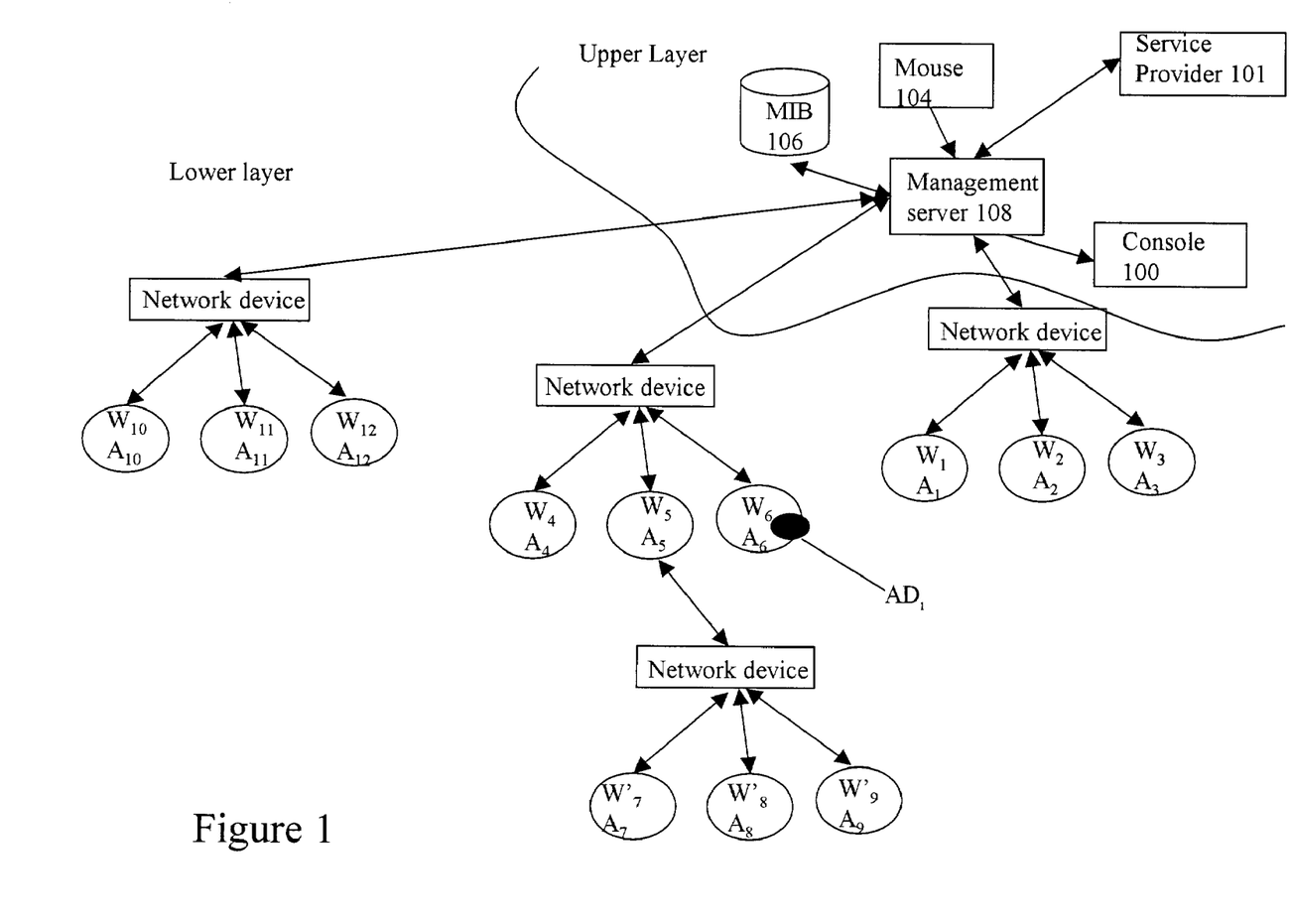
FIG. 1 is a schematic diagram illustrating the general structure of the framework for computer virus epidemic damage control in a network environment according to a preferred embodiment of the invention.

FIG. 1 is a schematic diagram illustrating the general structure of a framework for computer virus epidemic damage control in a network environment according to a preferred embodiment of the invention. The according to this particular embodiment system is a distributed computing environment comprising a plurality of devices. The system can be divided into an upper layer structure and a lower layer structure. The upper layer structure contains the devices in the upper stream of a management server. Conversely, the lower layer structure contains the devices for the downstream of the management server. The management server 108 according to this embodiment of the invention is a programmed digital computer having, user interface devices such as a console 100, keyboard 102 and mouse 104. In the described embodiment, each management server 108 is a network connectable computer or a server device, such as a Sun SparcStation™ workstation running the Solaris™ operating system, a version of the UNIX/RTM operating system, or an IBM-compatible computer running the Windows NT™ operating system. However, use of the systems and processes according to the invention are not limited to a particular computer configuration.

The management server 108 further includes a management information database (MIB) 106, such as a relational database, file system or other organized data storage system, which stores management information in the MIB. Moreover, the management server 108 can be connected with a service provider 101, typically a far end device for providing external services to the management server 108 including services such as tasks to be performed in the system originally not in the management server 108.

In the lower layer structure, a plurality of individual nodes, called device nodes Wi (where it is an integer), are functionally distributed. In the present invention, each device node Wi corresponds to a managed network device such as a processor, a notebook computer, a desktop computer, or a workstation or other network apparatus, even a handset, and a personal digital assistant (PDA). The state of each managed network device is monitored and controlled by an agent program running in the respective device node. For example, agent programs Ai run in device node Wi. Each agent may also have a local management information database ADi (as exemplarily shown in FIG. 1) that stores status information and parameters for the managed device. In the present invention, the agents can be preinstalled in each device node, or are generated by the management server 108. In operation, a management application program running in the management server 108 cooperates with the agents in managing the network respectively. The management server 108 can download information from the agents (Ai) or from their associated databases ADi. The management server 108 can also set parameters in the network devices by accordingly instructing the agent programs to set parameters and values therein or within their associated drivers.

Generally, a network is divided into different hierarchies such as geographical classification, management classification and detailed network information, which are accordingly displayed in the form of a map having a plurality of hierarchical levels. Such is performed so that the configuration of a large-scale complicated network can be readily identified. The device nodes (Ai) are formed herein as a first layer of the network, whereas the network according to other embodiments of the invention can be a multiple layer network including a first layer, second layer, third layers, etc. As illustrated in FIG. 1, a second layer sub-network is shown, which includes device nodes W'i. The device nodes W'i have generally the same structures as the device nodes Wi, such as their respective agents and agent MIBs.

The upper and lower layer structures in the network system according to this embodiment of the invention are connected as a network through a plurality of network devices such as switches, routers, gateways, etc. The network according to this embodiment includes, bit is not limited to, an Ethernet network, Internet, modified bus network, or the combinations of such networks.

Figure 2:
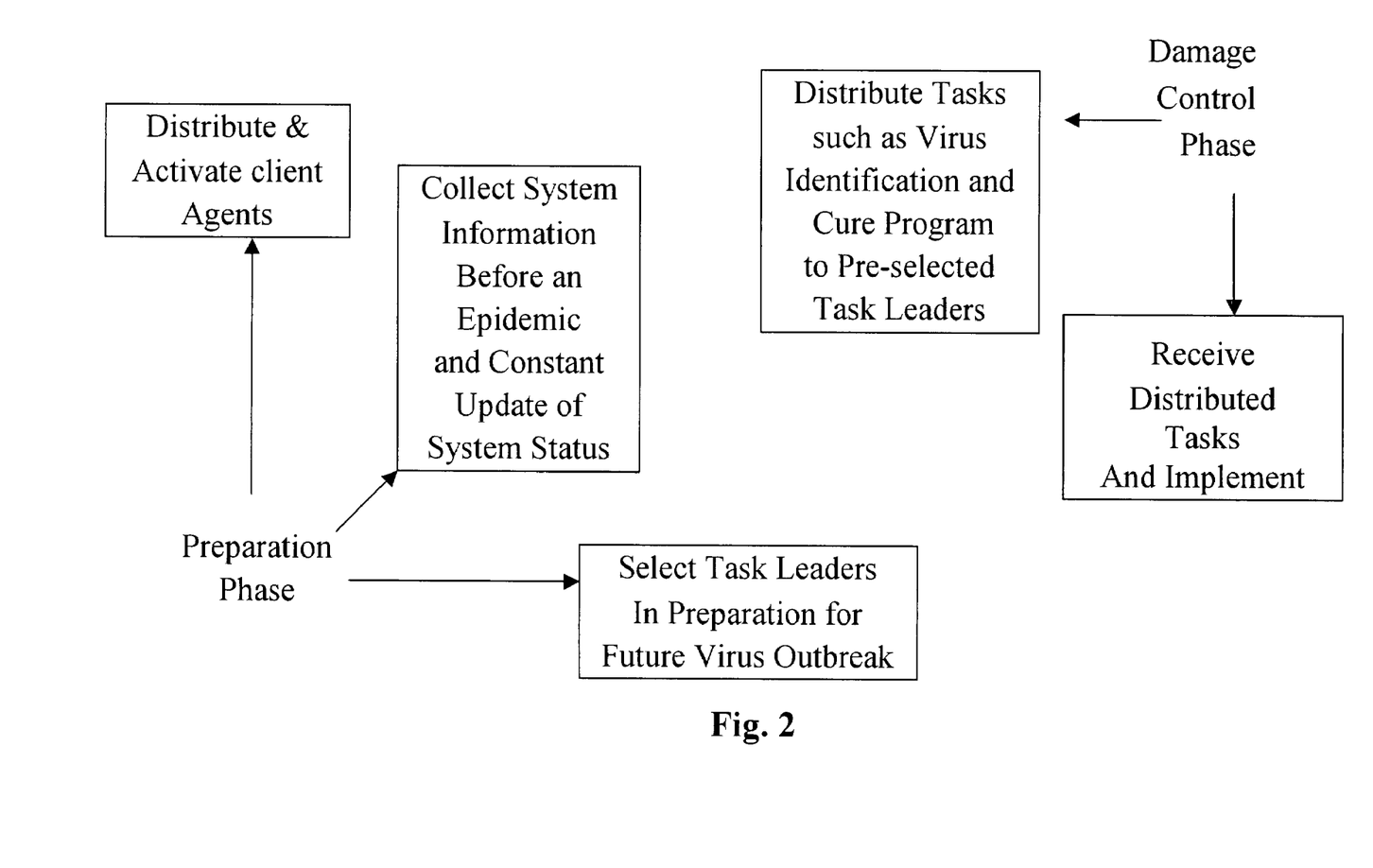
FIG. 2 is a block diagram schematically illustrating how the principal tasks are performed in the operating phases of an embodiment of the method according to the invention for imposing damage control against computer virus epidemic in an exemplary network environment.

FIG. 2 is a block diagram schematically illustrating the operation for imposing damage control against computer virus epidemic in a network according to an embodiment of the invention. Referring to FIG. 2, the method and system according to this embodiment of the invention are operated in two operation phases, namely a preparation phase and a damage control phase. The preparedness of a network in circumventing a malicious code attack can be improved by efforts conducted in the preparation phase. During a computer virus epidemic, a well-prepared network can respond and act rapidly so as to avoid damage to the network system. The tasks to be executed in the preparation phase mainly comprise distributing and activating client agents, collecting system (network) information before an epidemic and updating system status.

In the damage control phase, the objective is to keep virus damage at a minimum. The damage control system and method according to the invention in an exemplary local area network (LAN) provides a hierarchical distribution in receiving, implementing and distributing tasks such as virus identification and cure programs for pre-selecting task leaders in a virusoutbreak.

The operation paths of the method according to this particular embodiment of the invention are classified as two kinds, i.e., forward path and backward path. The forward path is initiated from the management server 108 and ends at a device node Wi. The backward path is initiated from a device node Wi to the management server 108. The backward path is mainly utilized as a path for reporting local conditions or for executing results for the management server 108.

Some sections of the network system according to the invention may be remote (e.g., not in the same building even the same city), but are still considered a part of the network.

In the case of a corporate LAN, the remote sections can be at different corporate offices, plants, distribution sites, data sites, etc. In other words, the present invention need not be physically constrained within the same network environment. For example, a wide area network (WAN) can be centered at the corporate headquarters and accordingly provide services to all the remote corporate LANs.

In a preferred embodiment of the present invention for damage control as implemented in, for example, a corporate LAN environment, the network system comprises a damage control server (i.e., the management server 108 in FIG. 1), a damage control console (DCC) 100, damage control agent (DCA) (e.g., agents Ai in FIG. 1), damage control units (DCU) (e.g., cures), damage control tasks (DCT) (e.g., tasks), secured communications channel (SCC), and damage control task leader (DCTL).

Management server 108 is the centerpiece of the system and method according to a preferred embodiment of the present invention. In one embodiment, the management server 108 performs the following functions, including linkage to (MIB 106), communication with the respective damage control agent (DCA) using a secured communications channel (SCC), accepting and executing commands from the damage control console (DCC), distributing commands from the DCC or scheduling commands to a selected DCA, accepting status reports from the respective DCA, packaging and distributing the respective damage control task (DCT), and controlling the execution of the DCT, recording and executing remote software/hardware (SW/HW) control of the respective DCT.

In maintaining an optimal relationship between the management server 108 and the DCA, the DCA is correlated with some information related to the management server 108 such as Internet Protocol (IP) address or host name. The correlation between the management server 108 and the DCA allows the two elements to interact with each other. Without such a correlation therebetween, the two elements confirm their mutual authentication before any interaction between the two is allowed.

The damage control console in the network system according to this embodiment of the invention (DCC) is a graphic user interface (GUI) program that implements at least the following functions including communication with the management server 108 using the secured communications channel (SCC), and querying information from the management server 108 and according generating a report. The queried information includes information such as software/hardware inventory, DCT execution status, and available DCU/DCTs, etc. The DCC further includes the functions of the DCU editor (Create/View/Edit/Delete), DCT editor (Create/View/Edit/Delete), and agent DCT control (Deployment/Execute/Status/Pause/Resume/Terminate).

The damage control agent (DCA) according to this particular embodiment is a daemon program running on the client machines in a network environment utilizing the an embodiment of the method according to invention. The functionality of the DCA comprises the following functions including communication with the management server 108 using the secured communications channel (SCC), accepting and executing commands from the management server 108 and status reporting reports back to the management server 108, accepting verifying and executing DCT from the management server 108 and status reporting to the management server 108, accepting and performing self-upgrade tasks and embedded commands when idle. The agents can be installed and remain inactive until needed. Otherwise, the agents can be installed at the occurrence of a particular event.

An additional advantage of the present invention is that the DCA requires virtually no future updates or upgrades. In this particular embodiment the invention, the maximum available resources are entered into the DCA, thereby achieving the objective of a "long-lasting agent." Alternatively, another embodiment of the invention advantageously provides a smooth and seamless upgrade mechanism for necessary upgrades to the agent.

The damage control unit or DCU (e.g., cures) is a component comprising any combination of the following elements, including a DCA embedded command, which is a command embedded in the DCA program module that can be readily and conveniently executed when required, direct line logic (DLL) with unified interface, which are program extensions having compatible interface to the main program, and non-user-interface (Non-UI) executable programs that are normally launched by another calling program. The DCU itself can be a constituent component of another DCU.

The damage control task (DCT) is distributed from the management server 108 to the DCA and is executed by the receiving DCA. A DCT comprises a DCT configuration including attributes or information for when to run the program, the type of operation for running the program, where to run the program and, the execution frequency such as the repeat frequency, the delay repeat frequency, and delay, and other miscellaneous attributes. The DCT further comprises a list of DCU (cures), each with execution configuration including the execution mode such as the serial or parallel mode, parameters, result log and report settings, and DCT execution control, and other miscellaneous attributes.

All communications conducted in the network system according to a preferred embodiment of the invention between different computers or machines are secured by a secured communications channel (SCC). A security communication mechanism is employed to prevent a DCA from executing false DCT. In order not to excessively degrade system performance, mechanisms are employed for server authentication and encryption, which can also be combined with a call-back scheme. Communication in the network system is generally initiated from the management server 108. For example, when the management server 108 communicates with a certain DCA it sends a small packet to that DCA. The DCA, in response, sends an acknowledgement (ACK) back to the management server 108 so that the management server 108 can conclude and close that connection with the corresponding DCA information. Mechanisms such as secured socket layer (SSL) can be used to ensure proper connection between the management server 108 and the DCA. This mechanism is generally suitable for systems utilizing a top-down information deployment. Under certain circumstances, the call-back scheme may not be necessary since security mechanisms such as SSL3 that support bi-directional server authentication.

Figure 3:
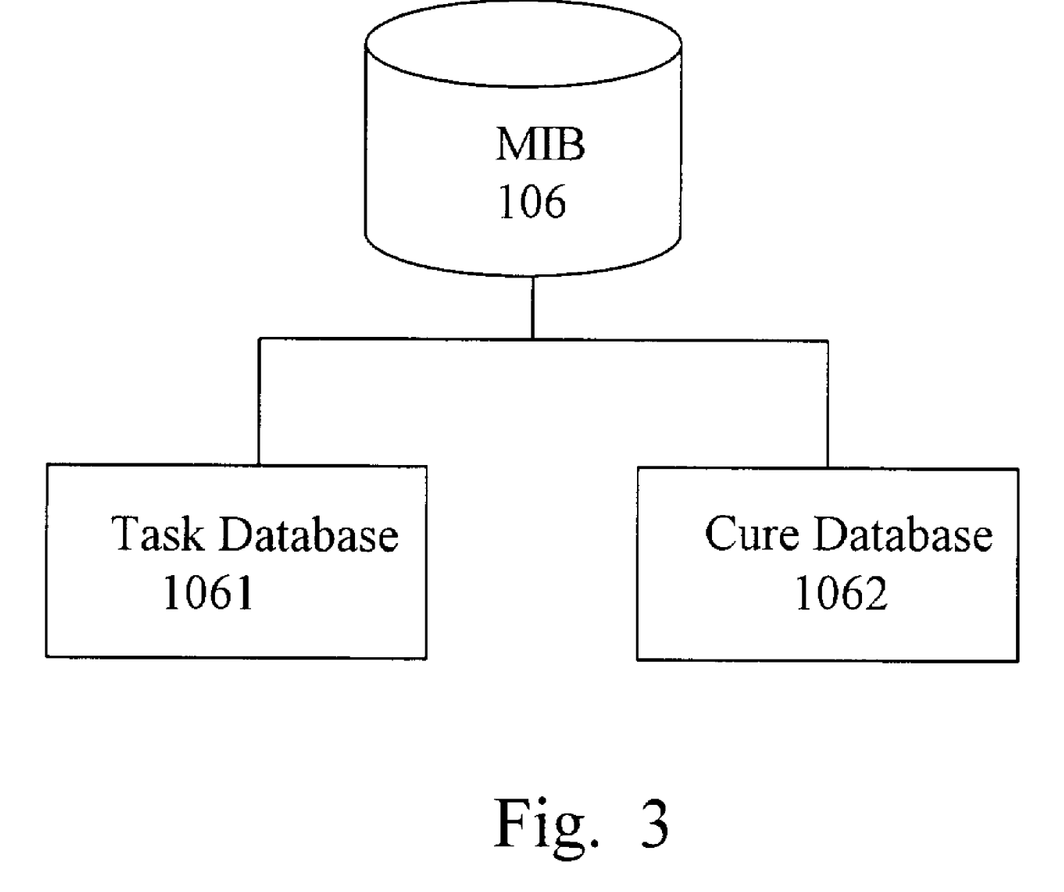
FIG. 3 is a block diagram illustrating the content of a management information database (MIB) according to an exemplary embodiment of the invention.

FIG. 3 is a block diagram generally illustrating an exemplary management information database (MIB) in a network system according to an embodiment of the invention. Referring to FIG. 3, it is illustrated that an MIB 106 can includes a task database 1061 and a cure database 1062. The task database includes a plurality of tasks which are performed by the management servers 108. The cure database 1062 includes a plurality of cures recorded therein for constructing tasks. The tasks and cures can be provided from the service provider 101.

In the present invention, the damage control is performed through task codes and parameters to handle relatively large networks. Task leaders (TLs) are selected according to task needs. In a task, once TLs are established, a given task in the entire network is implemented generally simultaneously on as many terminal devices (such as computers and workstations) as possible for virus outbreak control. The software tasks can be any tasks, including, in the data safety/security applications, virus outbreak control, virus infection containment, suspected malicious code detection, software distribution (such as program version updates), and the like. Information necessary for implementing a task is distributed as a task itself. Some tasks will be one-time tasks that can be implemented once in the network environment and then concluded, such as application software deployment and program updates. Some tasks will be implemented for a sustained period of time, such as intrusion detection and denial, new-breed virus infection and contagion control. The sustained tasks will include activities of task self-adjustment, such as virus pattern updates to cure mutated viruses, based on feedback of the implementation of the task itself.

An exemplary damage control task leader (DCTL) provides off-loading of the processing burden on the management server 108. A large load will be placed onto the management server 108 if all device nodes in the network environment directly communicate with the management server 108. The load on the management server 108 will be more burden some when it is operating under a critical network virus epidemic outbreak. In such a scenario, the bandwidth of the entire network is most likely saturated by the virus outbreak. The management server 108 sends predetermined commands to the damage control task leader (DCTL) and waits for its reply. The damage control task leader (DCTL) deploys the virus-cleaning and blocking tasks to the device nodes selected by the management server 108. The damage control task leader (DCTL) then follows up on the execution and then reports back upon completion of the execution. The DCA has the capability to differentiate between the damage control task leader and the management server 108 and report back to the management server 108 on unknown DCTL communication requests. Under normal circumstances, one layer of the damage control task leader installed in an embodiment of the network system according to the invention should be sufficient to achieve the above-mentioned tasks.

The damage control agent (DCA) accepts commands from the damage control task leader (DCTL). The DCA is protected from accepting commands (or communication) from unknown damage control task leaders. In an embodiment, static and dynamic methods (described below in further detail) allow the management server 108 to keep track of the damage control task leaders, the DCA in the task group, and the status of task execution.

A static DCTL for a pre-defined group of DCAs is used in allowing the management server 108 to keep track of DCTLs. A network utilizing the present invention can be divided into smaller groups based on network segmentation. In each segmented group, a DCTL can be selected and a correlation is established between that DCTL and its assigned device nodes in the same group. The availability of the DCTL in a virus outbreak and management efforts to keep the group and member list up-to-date are accordingly maintained.

Alternatively, dynamic DCTLs selected by the management server 108 an be used. In another embodiment of the present invention, a DCTL is selected based on its address and other information such as its resources that are available for future tasks. A DCT, along with a list of corresponding device nodes, is sent to that DCTL. The management server 108 then notifies each device node in the list regarding the task and corresponding DCTL information.

In a further embodiment of the present invention, a damage control task leader (DCTL) is selected based on the available resources and its physical location in the network environment. The resources include, but are not limited to, type and model of the central processing unit (CPU), amount of free memory, number of concurrently running processes, and performance of the network interface card (NIC), etc.

The damage control task leader is a special assignment to a device node and that assignment should be bound with the specific task at hand. Once that task is completed, the damage control task leader (DCTL) is retired. Thereafter, nodes will reject any commands not related to the then designated tasks. The present invention also provides for the DCA to communicate with the management server 108 and more than one DCTL at the same time as long as each DCTL includes a different Task ID (an identification tag for each designated task).

Cures and tasks can be created of the service provider 101. The service provider 101 in FIG. 1 is a task provider that provides tasks or cures not in the MIB 106 to the management server 108. The management server 108 performs the task in response to a request from the task provider 101 or stores the task in the MIB 106. Similarly, the task provider 101 can send cures to the management server 108 which stores the cures in the cure database 1062 where an updating mechanism is advantageously provided according to the invention. The task providers 101 can send new tasks or cures to the management server 108 by request of the management server 108 or other predetermined network arrangements.

An administrator of a network such as a corporate LAN can use the methodologies according to the invention for collecting information such as the vulnerability of each machine in the network prior to any computer virus attack. Once there is a virus epidemic, virus-blocking and cleaning tasks according to the invention can be deployed from a remote location. As the virus outbreak gradually fades in the late stage of the epidemic, the methods according to the invention can be implemented for monitoring on the status of the network so as to prevent the recurrence of virus spreading.

For task deployment and implementation, an agent program (i.e., the task agent) on each machine in the network is accordingly provided. This agent program receives commands from a designated central controlling machine and executes whatever commands or programs it receives in the form of program modules. Protection schemes are embedded in the programs so as to prevent them from being hijacked and becoming a virus attack carrier themselves. A central graphical user interface (GUI) program may be utilized as an easy interface for planning and executing the damage control tasks. This GUI is referred to herein as the damage control console 100 (DCC).

One embodiment of the present invention provides a separate program other than the DCC for handling communication with task agents as well data deposition and retrieval to and from the information repository. This frees the DCC from running on a pre-selected machine that allows for the future possibility of migrating the DCC program to all manner of Web and Internet applications.

Because of the differences among cure formulas for different virus attacks, the present invention is sufficiently generic to carry out deployment and execution of code-cleaning tasks. One embodiment of the present invention provides the capability to be pre-armed to meet and address attacks launched by known viruses. Another embodiment of the present invention can also perform a self-upgrade to a newer version in case any specific need for upgrades arises in the future.

Because different cure formulas are needed for different virus attacks, even with a large number of antivirus software experts working around the clock on a global basis, there will necessarily be some time delays before customers to an antivirus service provider can receive the specific formula for the specific attack. A preferred embodiment of the invention provides a script language for controlling the execution of embedded commands, a plug-in DLL, and executable programs deployed in the task agents in advance. Due to the higher level of risks involved in the direct deployment and execution of executable programs, cure formulas obtained from an antivirus service provider require further solutions by the combination of embedded commands and plug-in DLLs. The support advantageously provided by the invention for external program execution is in principle targeted at cures for which it is extremely difficult to create utilizing commands or DLLs, and cures having the flexibility to operate from a second service provider or from other different sources.

A further embodiment of the invention provides the capability to perform inventory inspection in and over the entire network environment, and to implement control over software and hardware therein. An embodiment of the present invention provides software/hardware inventory and remote management capability for the software and hardware that are involved in the implementation of the damage control tasks. User inspection capability is an added function, as it is the only damage control capability a network has before obtaining a specific cure from an antivirus service provider.

Another embodiment of the invention advantageously allows users to define their own damage control unit (DCU) for emergency use. The DCU is accordingly functional only when a network virus epidemic outbreak occurs. End users can create a DCU in advance of an epidemic based on their particular needs and the current status of their network environment, using the DCU and damage control tasks DCTs.

An embodiment of the invention constructed in accordance with the above-described component can be considered to be passively providing its intended functionality. In yet another embodiment of the invention, an active approach is provided by the employment of predetermined monitoring schemes before, during, and after the virus epidemic. These active measures, which advantageously contribute to the effort of reducing damage level while an entire network environment is under virus attack, include at least a virus scanning system deployed onto the network environment. A scanning system based on, for example, sniffing technology and launched before, during and after an epidemic provides at least the following functions including early warning of a network epidemic outbreak, neighborhood monitoring, provision of more detailed and accurate trace-back of the virus attack, cyber patrolling in an observation period, and identification of other monitors in the network environment.

The virus scanning system according to a preferred embodiment of the invention provides early warning of a network epidemic outbreak. A scanning module is deployed for monitoring abnormal usage of network segment's and trigger and outbreak alert to the management server 108. Predetermined traffic analysis schemes can be employed to make this monitoring more accurate, such as an analysis scheme monitoring a predetermined number of device nodes that generate mass traffic. To ensure adequate coverage, that traffic should have large portions in common. Moreover, a virus pattern recognition is used. Known virus patterns are used to trace the abnormal network usage so as to determine whether virus exists in the application software. Furthermore, a heuristic analysis is utilized to find abnormal sections in application software based on the predetermined knowledge of data formats. Data are stored or packaged in accordance with predetermined formats, which are matched and utilized to track computer viruses in the network system. In addition, the scanning module according to this embodiment of the invention also keeps a record of when and which device nodes start generating traffic. This is helpful for tracing back to the source of a virus outbreak.

The early warning virus scanning system according to the invention further provides the capability of neighborhood monitoring in the network environment. An early warning capability utilizes neighborhood listening devices. This function according to this particular embodiment of the invention is to cover especially non-Wintel (Windows-Intel) platforms. This function advantageously prevents an outside intruder or visitor from initiating a virus outbreak when plugging a mobile computer into a network, e.g., a corporate LAN. For best network management practices, a dedicated network segment which is configured specifically for visitors will generally have the neighborhood monitoring enabled.

For device nodes of a non-Wintel platform, some will have no proper agents acceptable to the management server 108. If the network system detects one device node having abnormal traffic, the management server 108 then assigns at least one device node near the non-Wintel device nodes for monitoring virus outbreak. There are plurality of manners for determining whether there is a virus outbreak e.g., based on statistics of abnormal traffic or activities, virus patterns or analyses of the behavior of the outgoing sequence with normal behavior.

The virus scanning system according to the invention can further include an outbreak trace back function. This scanning capability is for finding unprotected spots in the network system. A functionality for monitoring the activities of network traffic (combined with the function of early warning of virus outbreak) is advantageously provided. Once the outbreak early warning functionality has been triggered, the outbreak track-back module analyzes the data collected starting from a predetermined time prior to the issue of the warning and pin points the first introduction of the virus attack into the network environment. The data can also be passed along to an outbreak container or quarantine, which is a module that draws a suggested firewall line enabling an end user to secure the outbreak area.

In addition, the virus scanning system according to the invention provides cyber patroller in an observation period in the network environment. When a virus alert is raised, or after the successful clearing of an alert, the behavior of the network need to be monitored for at least some appropriate period (called the "observation period"). In this observation period, certain device nodes can be selected to be the cyber patroller to specifically monitor any trace of the traffic pattern of a virus attack. A further application of this function is to provide a list of device nodes which do not have DCA installed.

A further capability of the virus scanning system according to the invention is for identifying other listening devices in the network environment. Under normal circumstances, there should not be any network listening devices unknown to the network environment. An overall view of listening devices in the network is provided in addition to the neighborhood monitoring conducted in the normal course of running the network system.

In some cases, it is necessary to ensure the proper communication between the DCA and the management server 108 when necessary so as to maintain overall security integrity. If the original management server 108 functions properly, it can send commands to request the DCA to switch to another management server. When the management server 108 is unable to do that (due to hardware failure or other factors), such is reported to the DCA which in turn switches to another management server, especially when there is an epidemic outbreak in the network. Thus, all DCAs are required to accept a new management server if the original one is not thereafter available.

The virus scanning system according to the invention further provides a comprehensive, network-wide "super user" password to modify the management server list. This non-stop management server service allows the changing of the host setting in the management server 108 on all the DCAs by sending a single command with the "super user" password.

A process for grouping and switching in the network system according to the present invention is further provided. When an abnormal event occurs in the network, is reported to the management server 108. While the management server 108 is unable to treat the abnormal event immediately or find proper cures to resolve the abnormal event, the management server 108 finds a domain that encloses an infected region containing a plurality of device nodes possibly infected by computer viruses. The management server 108 then switches all traffic out of the infected region.

Figure 4:
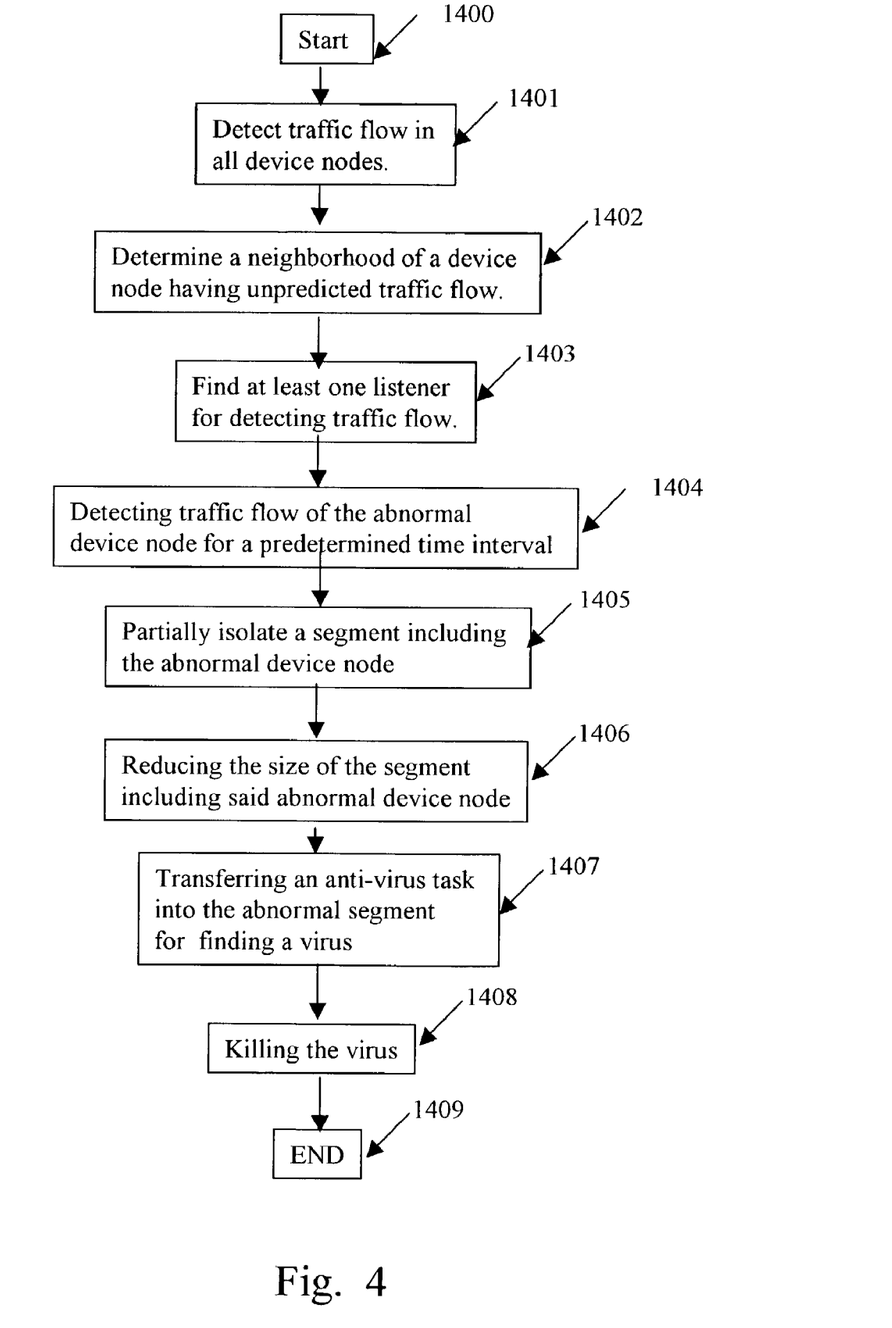

A process of the virus epidemic damage control method for early virus detection will be described hereinafter with reference to FIG. 4, beginning with step 1400. In step 1401, traffic flow in all device nodes is monitored for finding abnormal traffic flow. In step 1403, a neighborhood of a device node having unpredicted traffic flow is determined. The device node having unpredicted traffic flow is defined as an abnormal device node, whereas a device node having predicted traffic flow is defined as a normal device node. In step 1404, the management server 108 finds at least one listening device for monitoring and detecting the traffic flow of the abnormal device node. In step 1405, the traffic flow of the abnormal device node is determined for a predetermined time interval by the listening device. In step 1406, a segment in the network system including the abnormal device node is partially isolated other than instructions and results assigned by the management server 108. The segment having the abnormal device node is called the abnormal segment. In step 1407, the size of the segment including the abnormal device node is reduced by rejecting the normal device node. Next, in step 1408, the management server 108 transfers an antivirus task into the abnormal segment for pinpointing a computer virus. In step 1409, the management server 108 instructs the task leader to eradicate the virus, where the process ends at step 1410.

An optional damage control method according to the invention is by finding identical sections in a plurality of files being modified in a relatively short time period. A prominent virus behavior is the modification of a large number of files in a relatively short time period where the modified sections are generally identical or similar. Such characteristics of virus infection can be advantageously used for early virus detection.

Figure 5:
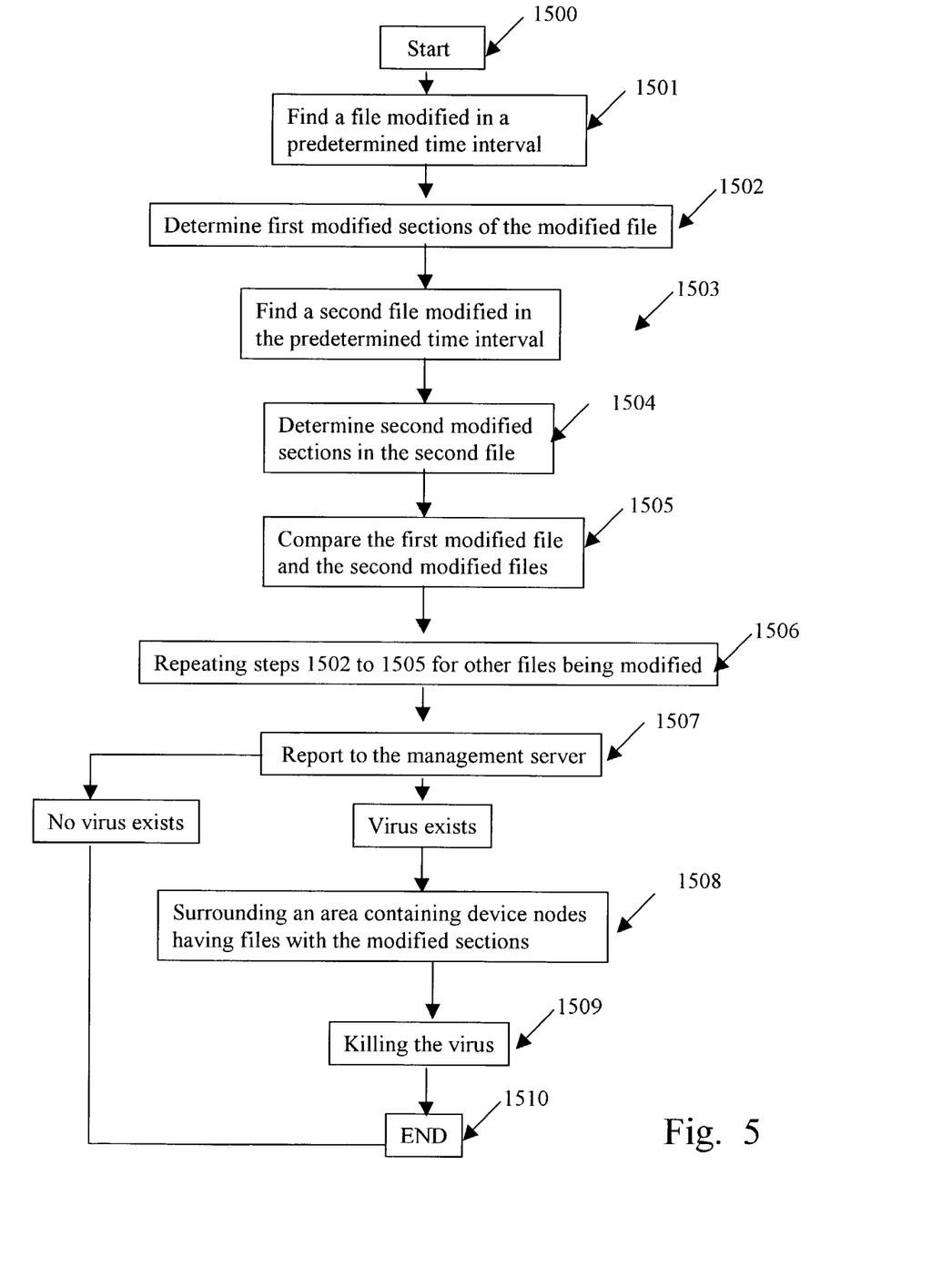
FIG. 5 is a flow diagram illustrating a process for finding a computer virus by searching the modified sections in the files of a network system according to a further embodiment of the invention.

FIG. 5 is a flow diagram illustrating an exemplary process for early virus detection by searching the modified sections in network files according to the invention, beginning with step 1500. In step 1501, the network system finds a file having been modified in a predetermined time interval. In step 1502, the system determines a first plurality of modified sections in the modified file. In step 1503, the network system finds a second file having been modified in the predetermined time interval. In step 1504, the network system determines a second plurality of modified sections in the second file. Then in step 1505, the network system compares the first and second modified files. Next, in step 1506, steps 1503 to 1505 are repeated for other files having been modified in the predetermined time period. In step 1506, the condition of the virus infection is reported to the management server 108. If no virus is found, i.e., all modified sections from the modified files are not identical nor similar, then the process in step 1510. Otherwise, in step 1508 the management server 108 is informed that a virus attack is possibly initiated if a significant number of modified sections from the modified files are generally identical or similar. In step 1509, the network system surrounds or quarantines an area containing device nodes with files with the modified sections. In step 1510, the network system transfers an antivirus task into that area for pinpointing a virus and eradicating the virus.

As a result of such active and preventive virus scanning according to the invention, early warning of possible virus attacks are effected to reduce the damage level even if a virulent outbreak does occur. Suspected viruses can also be treated with counter-offensive measures such as containment of the suspected codes.

Although the above examples were primarily concerned with computer networks herein, the present invention is also advantageously applicable to any kind of network utilizing any kind of terminal or subscriber devices. The scope of applicability of the present invention accordingly includes mobile phone network systems, personal digital assistant (PDA) devices, handyphone systems, cellular mobile devices of any scale, and any other wired or wireless communications system which utilizes a network, be it large or small, as long as it may be subject to virus or virus-like attack.

Although the invention has been described with reference to the preferred embodiments, it will be understood that the invention is not limited to the details described thereof. Although the system and method according to the invention are described herein utilizing LANs as examples of implementation, the scope of the invention is not limited to LANs. Substitutions and modifications have been suggested in the foregoing description, and other will occur to those of ordinary skill in the art. In particular, the process steps of the method according to the invention will include methods having substantially the same process steps as the method of the invention to achieve substantially the same result. Therefore, all such substitutions and modifications are intended to be within the scope of the invention as defined in the appended claims and their equivalents.

I claim:

1. A method of detecting a malicious computer program in a computer network having a plurality of network nodes, the method comprising:
   identifying a first file having a first content that has been modified within a predetermined time interval;
   identifying a second file having a second content that has been modified within the predetermined time interval;
   determining whether the first content and the second content are substantially identical;
   if the first content and the second content are substantially identical, notifying a computer network server that a malicious computer program is present in the computer network; and
   if the first content and the second content are not substantially identical, continuing normal operation of the computer network wherein the first file is on a first network node and the second file is on a second network node.

2. A method as recited in claim 1 further comprising:
   identifying a critical number of files, each file having a content that has been modified within the predetermined time interval; and
   determining whether the content in each of the critical number of files are substantially identical to one another.

3. A method as recited in claim 2 further comprising:
   if the content in each of the critical number of files are substantially identical to one another, notifying a computer network server that a malicious computer program is present in the computer network.

4. A method as recited in claim 2 wherein the critical number of files is distributed over a plurality of network nodes.

5. A method as recited in claim 1 wherein the computer network server executes a process of eliminating the malicious computer program.

6. A method as recited in claim 5 farther comprising transmitting a curative computer program to the computer network.

7. A method as recited in claim 1 wherein notifying a computer network server further comprises excluding a network area containing one or more network nodes storing the first content and the second content from normal network operation.

8. A method as recited in claim 1 wherein notifying a computer network server further comprises designating a task leader for executing work normally executed by the computer network server, such that the server is not overloaded with curative and prevention functions if a malicious computer program is present.

9. A method as recited in claim 1 wherein the computer network is a network of subscriber devices including mobile phones and portable communication devices.

10. A method as recited in claim 1 wherein the computer network is a wireless communication system and the plurality of network nodes includes mobile phones, hand-held portable devices, and IP-enabled devices.

* * * * *

UNITED STATES PATENT AND TRADEMARK OFFICE
CERTIFICATE OF CORRECTION

| | | |
|---|---|---|
| PATENT NO. | : 7,062,553 B2 | Page 1 of 1 |
| APPLICATION NO. | : 10/199078 | |
| DATED | : June 13, 2006 | |
| INVENTOR(S) | : Yung Chang Liang | |

It is certified that error appears in the above-identified patent and that said Letters Patent is hereby corrected as shown below:

In the Specification:

Column 1, line 38, delete "In fact," at the end of the line.

In the Claims:

In line 1 of claim 2 (column 14, line 4) change "rccited" to --recited--.

In line 1 of claim 6 (column 14, line 22) change "farther" to -- further--.

Signed and Sealed this

Fourth Day of September, 2007

JON W. DUDAS
*Director of the United States Patent and Trademark Office*